(12) United States Patent
Dunnell et al.

(10) Patent No.: US 10,484,305 B2
(45) Date of Patent: Nov. 19, 2019

(54) METHOD AND APPARATUS FOR DELIVERING COMMUNICATIONS

(71) Applicant: Buckeye Mountain, Inc., Akron, OH (US)

(72) Inventors: Greg Dunnell, Akron, OH (US); Steve Hill, Akron, OH (US)

(73) Assignee: Buckey Mountain, Inc., Akron, OH (US)

( * ) Notice: Subject to any disclaimer, the term of this patent is extended or adjusted under 35 U.S.C. 154(b) by 0 days.

(21) Appl. No.: 15/948,636

(22) Filed: Apr. 9, 2018

(65) Prior Publication Data

US 2019/0058674 A1 Feb. 21, 2019

Related U.S. Application Data

(60) Provisional application No. 62/546,782, filed on Aug. 17, 2017.

(51) Int. Cl.
| | | |
|---|---|---|
| *H04M 1/00* | (2006.01) | |
| *H04L 12/931* | (2013.01) | |
| *H02S 40/38* | (2014.01) | |
| *H02S 99/00* | (2014.01) | |
| *H04L 12/10* | (2006.01) | |
| *H02J 3/38* | (2006.01) | |
| *H04W 88/08* | (2009.01) | |
| *H02J 7/35* | (2006.01) | |
| *H04L 12/12* | (2006.01) | |

(52) U.S. Cl.
CPC .............. *H04L 49/40* (2013.01); *H02S 40/38* (2014.12); *H02S 99/00* (2013.01); *H02J 3/385* (2013.01); *H02J 7/35* (2013.01); *H04L 12/10* (2013.01); *H04L 12/12* (2013.01); *H04W 88/08* (2013.01)

(58) Field of Classification Search
CPC ......... H04L 49/40; H04L 12/10; H04L 12/12; H02S 40/38; H02J 3/385; H02J 7/35; H04W 88/08; H94W 88/085
USPC ........................... 455/572, 573, 343.1, 343.6
See application file for complete search history.

(56) References Cited

U.S. PATENT DOCUMENTS

| | | | | |
|---|---|---|---|---|
| 4,959,087 | A * | 9/1990 | Kappernaros | A61L 9/122 239/60 |
| 8,369,997 | B2 * | 2/2013 | Valin | G06Q 20/204 700/286 |
| 9,673,530 | B2 * | 6/2017 | Mackie | H01Q 9/18 |
| 9,888,081 | B1 * | 2/2018 | Farinelli, Jr. | H04W 40/20 |
| 2012/0054571 | A1 * | 3/2012 | Howard | H04W 4/50 714/748 |
| 2012/0307070 | A1 * | 12/2012 | Pierce | H04N 5/2252 348/159 |
| 2014/0026155 | A1 * | 1/2014 | Valin | G01D 4/002 725/5 |
| 2016/0044281 | A1 * | 2/2016 | Canfield | H04N 7/181 348/151 |
| 2016/0370328 | A1 * | 12/2016 | Thompson | G01N 1/2247 |
| 2017/0222475 | A1 * | 8/2017 | Van Straten | H02J 7/355 |
| 2017/0272491 | A1 * | 9/2017 | Ortiz | H04L 67/1095 |

(Continued)

*Primary Examiner* — Sonny Trinh (74) *Attorney, Agent, or Firm* — Nixon & Vanderhye, P.C.

(57) ABSTRACT

The disclosed technology herein relates to delivering communications services, and more particularly to portable self-contained rugged systems and methods for providing and supporting communications capabilities in remote areas including but not limited to railway yards.

20 Claims, 11 Drawing Sheets

(56) References Cited

U.S. PATENT DOCUMENTS

2017/0318325 A1* 11/2017 Ortiz .................... H04N 21/436
2019/0141178 A1* 5/2019 Berggren .......... H04M 1/72527

* cited by examiner

METHOD AND APPARATUS FOR DELIVERING COMMUNICATIONS

CROSS-REFERENCE TO RELATED APPLICATIONS

This application claims benefit of U.S. Provisional Application No. 62/546,782 filed Aug. 17, 2017, incorporated herein by reference.

STATEMENT REGARDING FEDERALLY SPONSORED RESEARCH OR DEVELOPMENT

None.

FIELD

The technology herein relates to delivering communications services, and more particularly to portable self-contained rugged systems and methods for providing and supporting communications capabilities in remote areas including but not limited to railway yards.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE EMBODIMENTS

Figure 1:
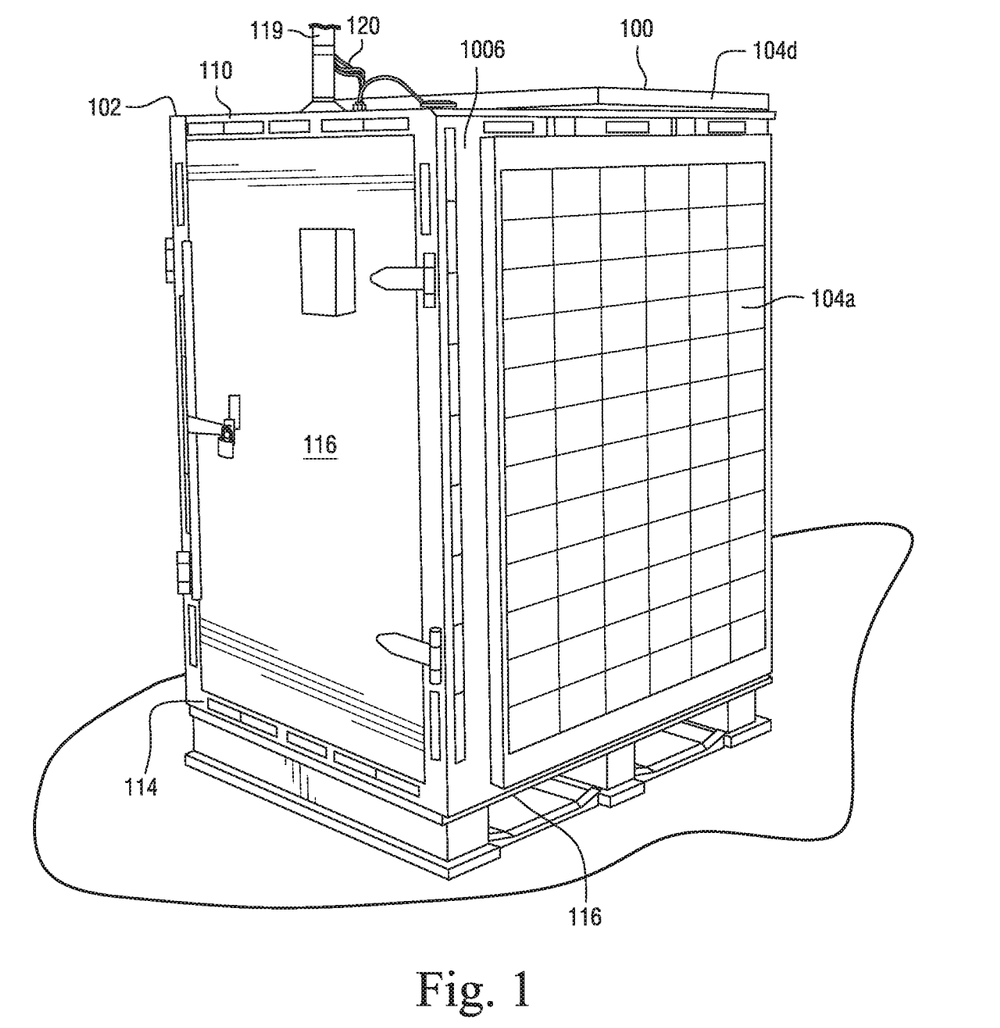
FIG. 1 shows a side elevated view of a system deployed at a rail yard or other location.
Figure 2:
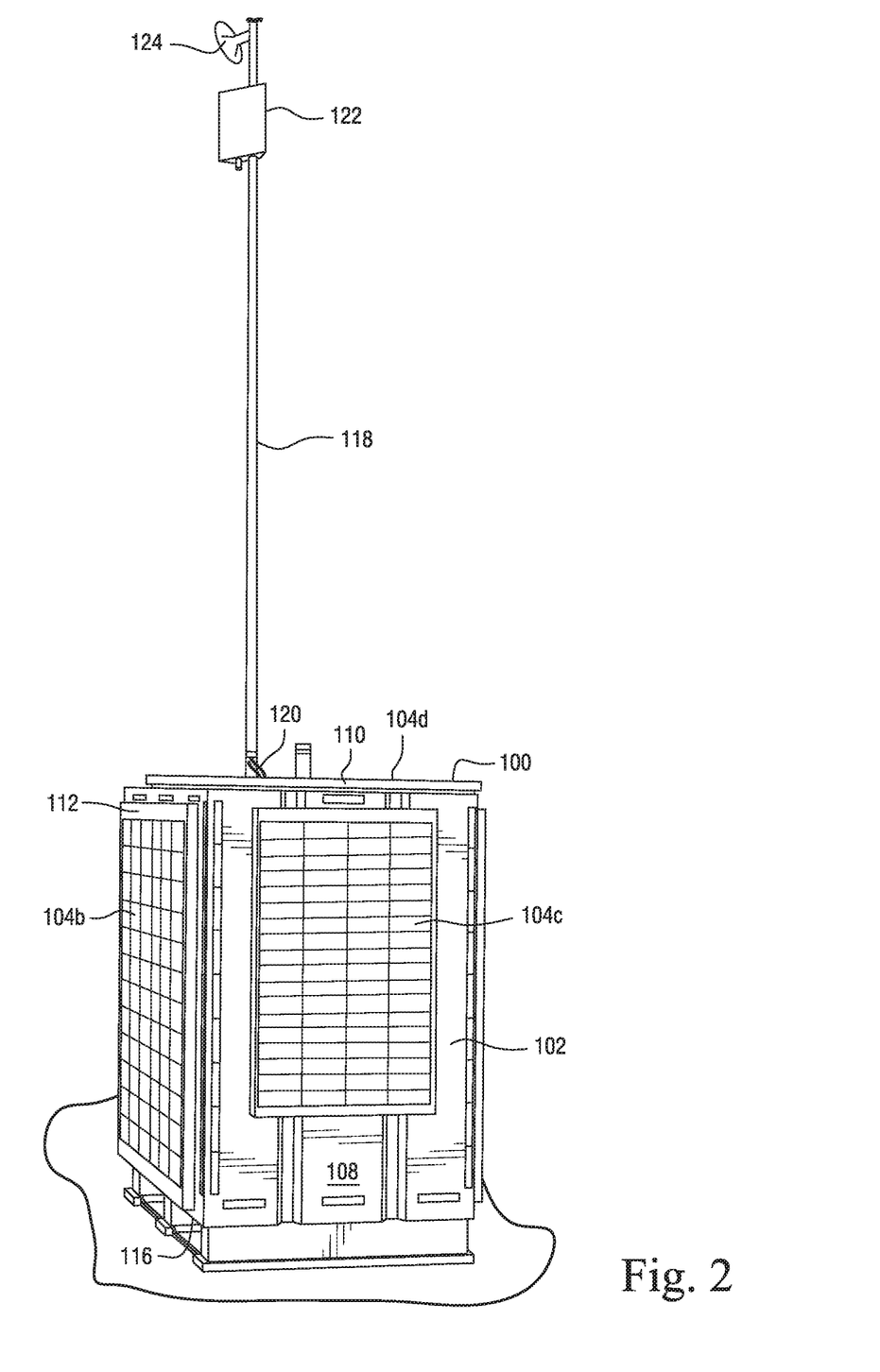
FIG. 2 shows another side elevated view of the system.
Figure 3:
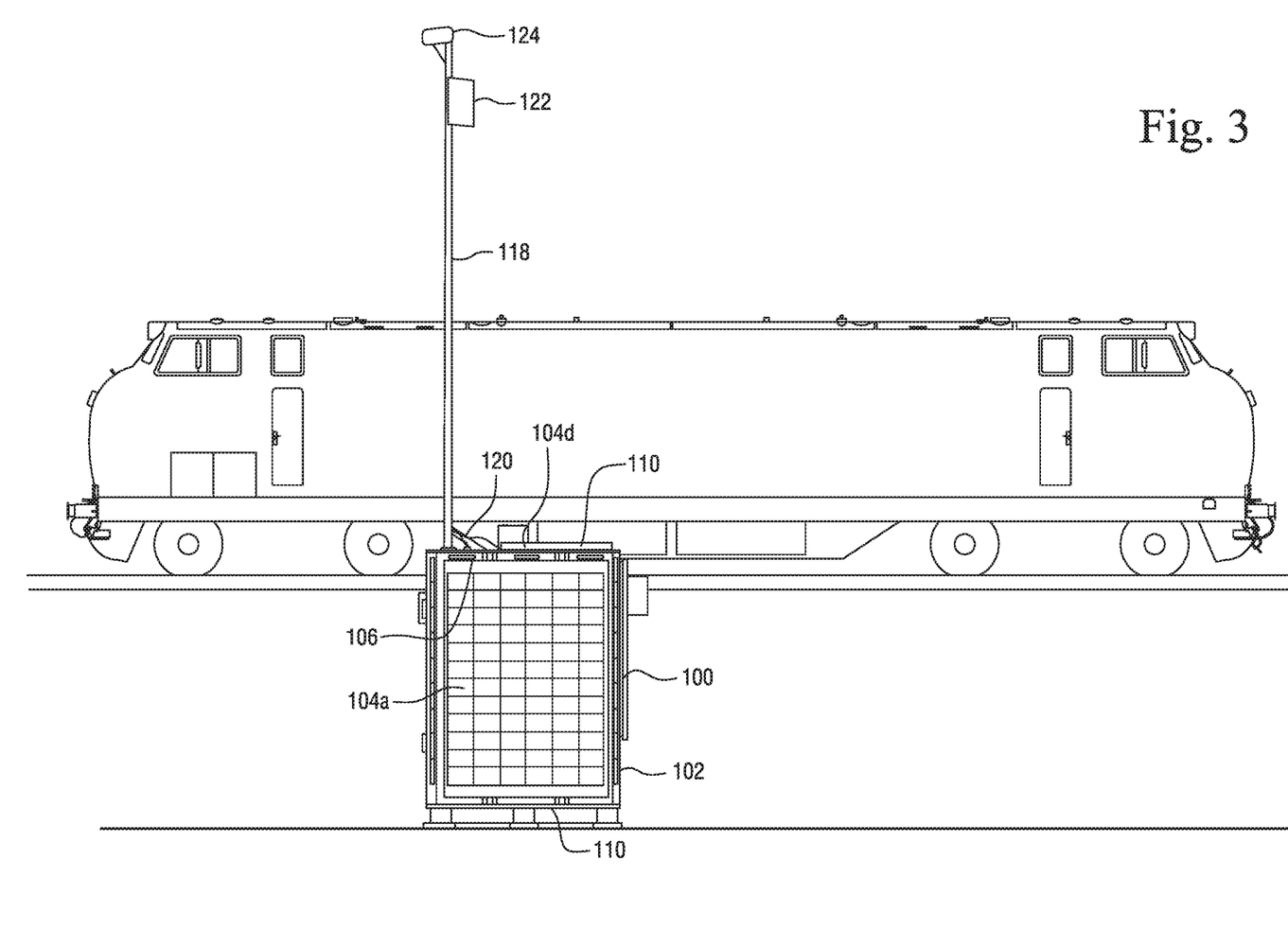
FIG. 3 shows a front elevated view of the system.

FIG. 1 shows a side elevated view of an example non-limiting communications system 100 deployed at a rail yard or other location. FIG. 2 shows another side elevated view, and FIG. 3 shows an example front elevated view.

The system 100 shown in these diagrams comprises a metal (steel or aluminum) chassis 102 that is box-like in construction. On the outer surfaces of the chassis 102 are mounted photovoltaic panels 104 of different sizes. For example, the front surface 106 (as shown in FIGS. 1 and 3) has a large photovoltaic panel 104a mounted thereon, whereas the side surface 108 (see FIG. 2) has a smaller photovoltaic panel 104c mounted thereon. In addition, the top surface 110 of the chassis facing the sky has another photovoltaic panel 104d mounted thereon, and a further photovoltaic panel 104b is mounted on the back surface 112 of the chassis opposing the front surface 106. Thus, of the five surfaces of the chassis excluding the bottom surface 116, four of these five surfaces (106, 108, 110, 112) have PVT panels 104 disposed on them. The fifth surface 114 is in the form of a locked, hinged access door or panel 116 (as can be seen in FIG. 1). The access door or panel 116 permits a system installer or maintainer to access internal components. During normal operation, the door 116 remains closed and weatherstripping prevents weather, moisture and other effects from penetrating inside the chassis 102.

The photovoltaic solar panels 104 provide a total of 600 Watts of electrical output power when exposed to full sun (e.g., two panels may each comprise 100 watt panels producing 44.6 volts at 2.78 amps, and two panels may each comprise 200 watt panels producing 44.6 volts at 5.45 amps). The photovoltaic solar panels 104 were chosen to be arranged East, South, West and Up. No tilting or aiming is necessary. The unit should be installed with the entry door 116 facing North. The system 100 can continue to operate even if a panel 104 is damaged.

An extension pole 118 is mounted through the upper surface 110 of the chassis 102. The extension pole 118 may be an aluminum or steel antenna pole. Cables 120 may be mounted within or on the outside of the pole 118. The pole 118 supports communications equipment 122 and video cameras 124, as will be described below.

Figure 4:
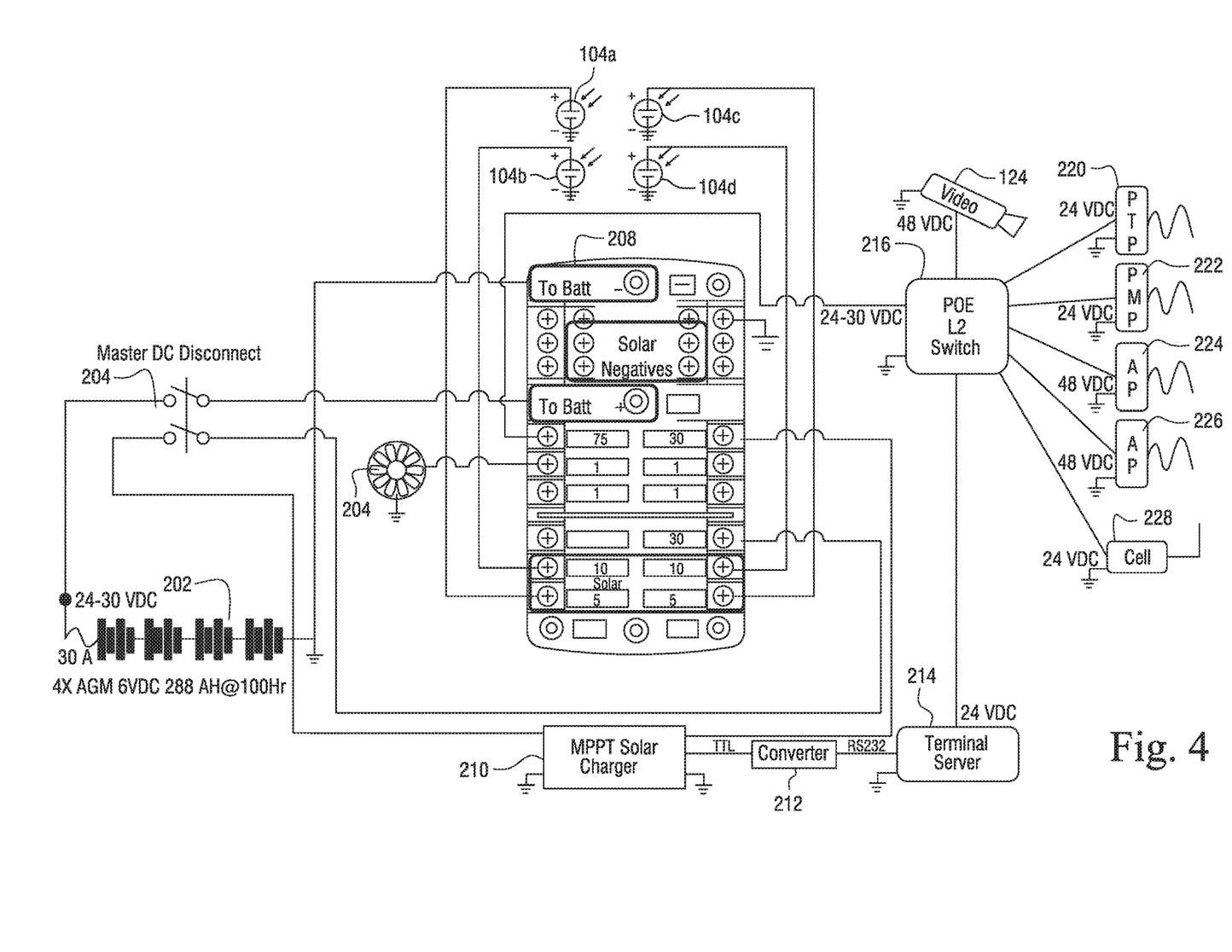
FIG. 4 shows an example schematic diagram.
Figure 5:
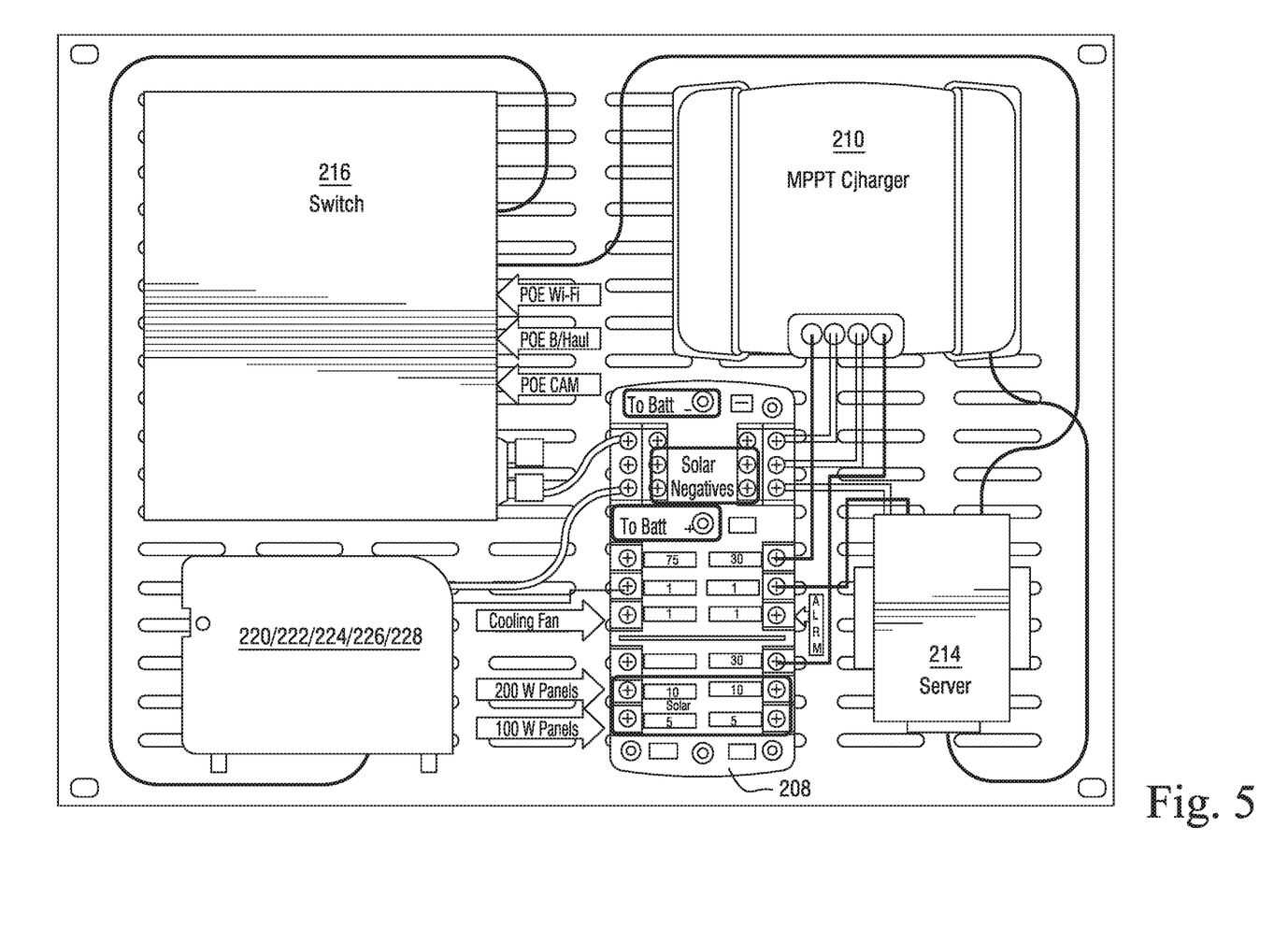
FIG. 5 shows an example electronics assembly.
Figure 6:
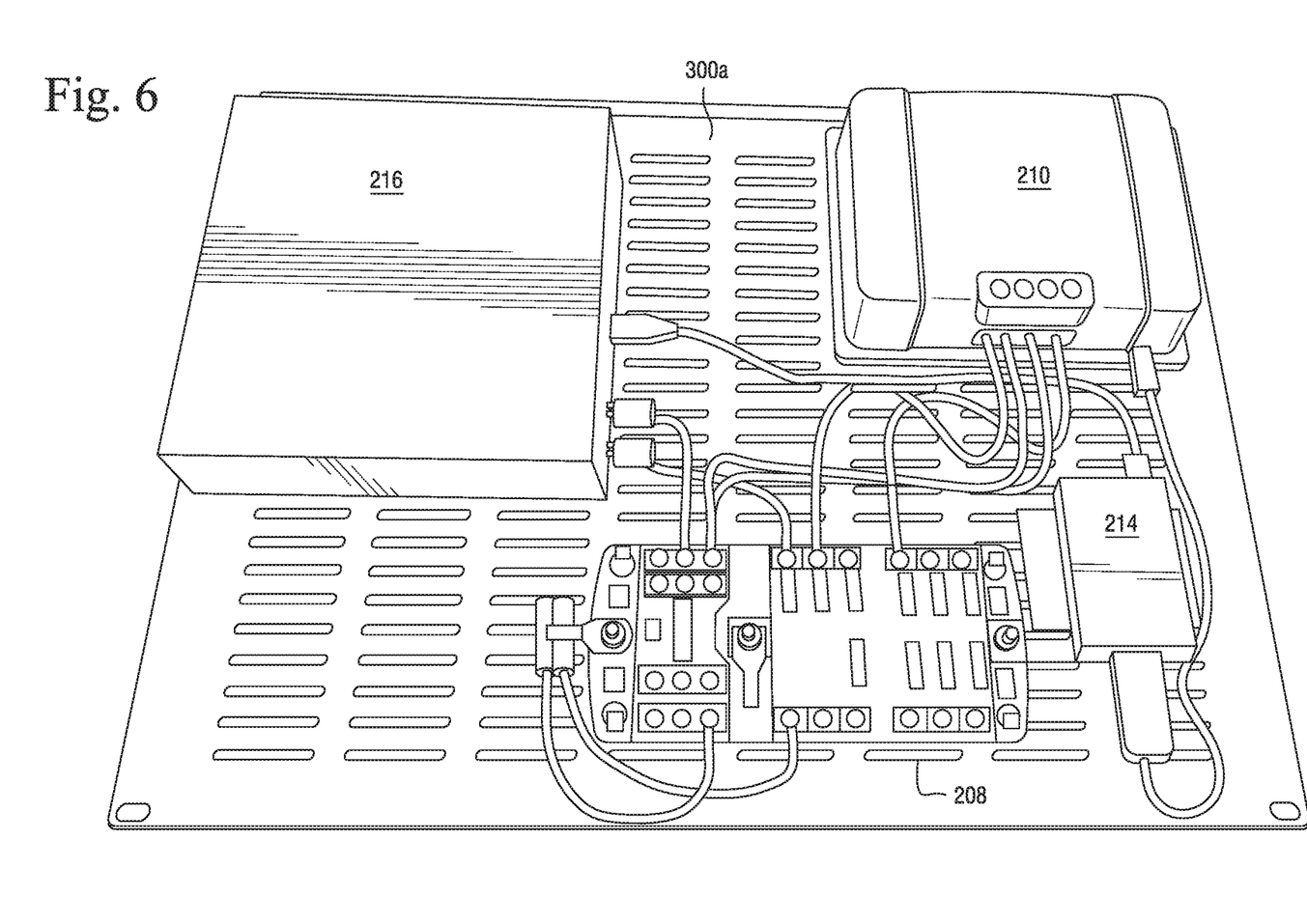
FIG. 6 shows another view of an electronics assembly.
Figure 7:
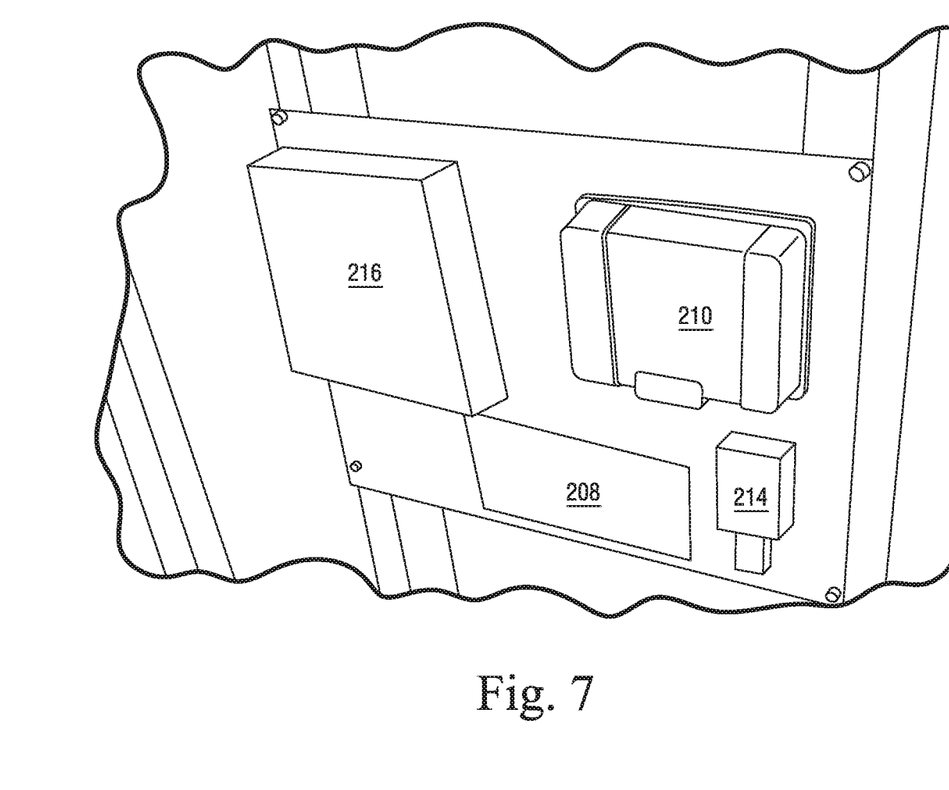
FIG. 7 shows example thermal management/filtration components.

FIG. 4 is an example schematic diagram of the system 100. The system 100 includes a battery bank 202, a master DC disconnect switch 204, an MPPT solar charger 210, a converter 212, a terminal server 214, a POE L2 switch 216, a video camera 124, a variety of communications equipment such as a point-to-point transceiver 220, a point-to-multi-point transceiver 222, an access point 224, a further access point 226, a cellular radio transceiver 228, a connection block 208, and the above-described PVT panels 104.

Cutting Edge Marine Grade MPPT Charge Controller 210 can squeeze enough power out of a fully overcast and rainy day to continue operations indefinitely without direct sunlight. Four six volt 288 AH AGM batteries combined in series (bank 202) provide 6912 Watt Hours of backup energy. With a typical draw of 17 Watt Hours (1 Backhaul 220, 1 AP 224, Ethernet Switch 216, Charge Controller Management 210, Fixed Video Camera 124) the battery back 202 could continue to power all devices for over 8 days in the event of a total solar power system failure. Large Capacity is needed to extend cycle life to more than 48 months. Batteries 202 also act as weight ballast.

The system 100 is completely sealed and maintenance free. There is no unsafe Hydrogen gassing. Only the Hardened Ethernet Switch/Power hub 216 has an internal fan 224. This fan has a MTBF of 50,000 hrs and is bearing, bushing and brush free. The fan blade assembly is magnetically levitated and friction free.

Figure 8:
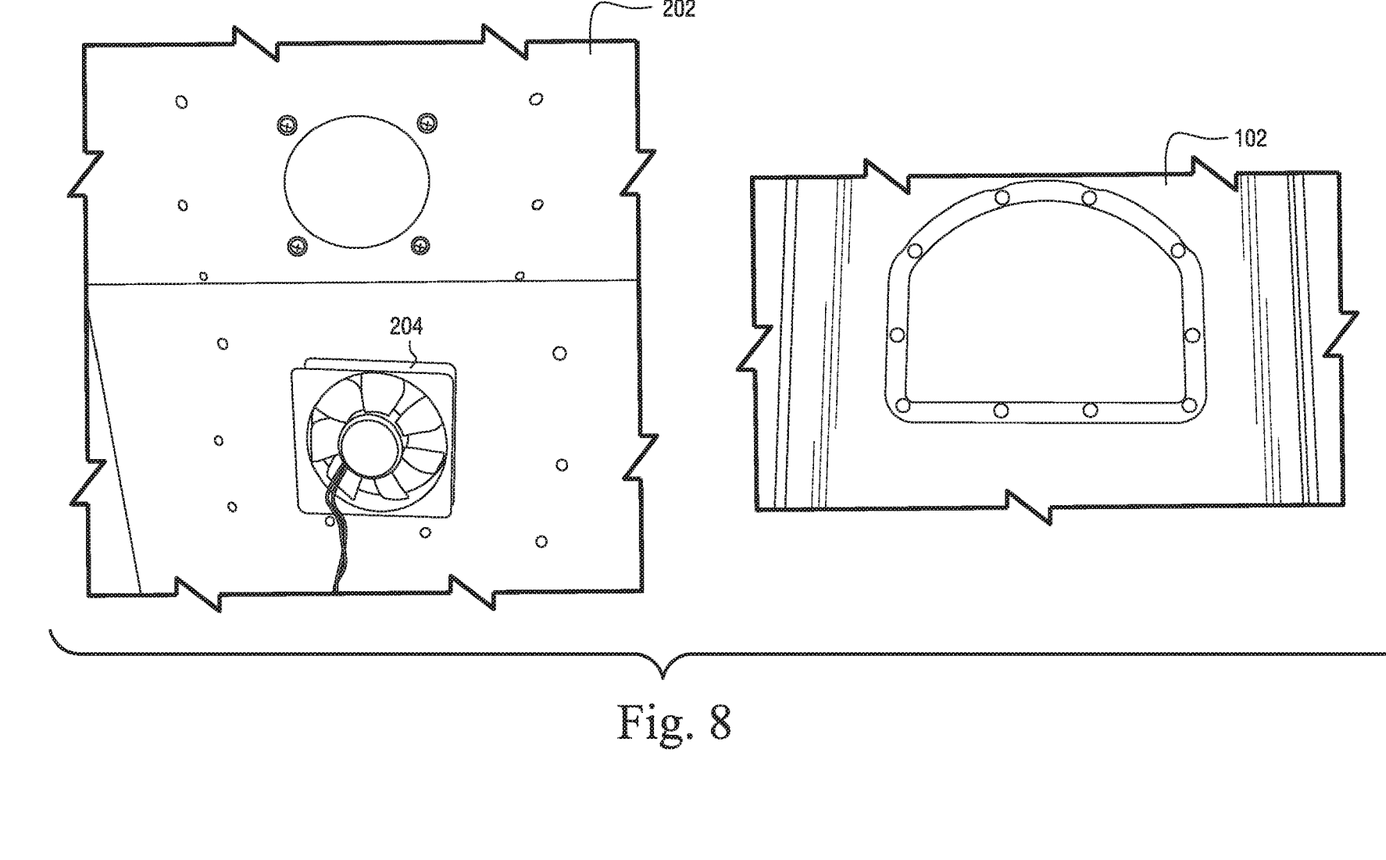
FIG. 8 shows example secondary enclosure fan assemblies.
Figure 9:
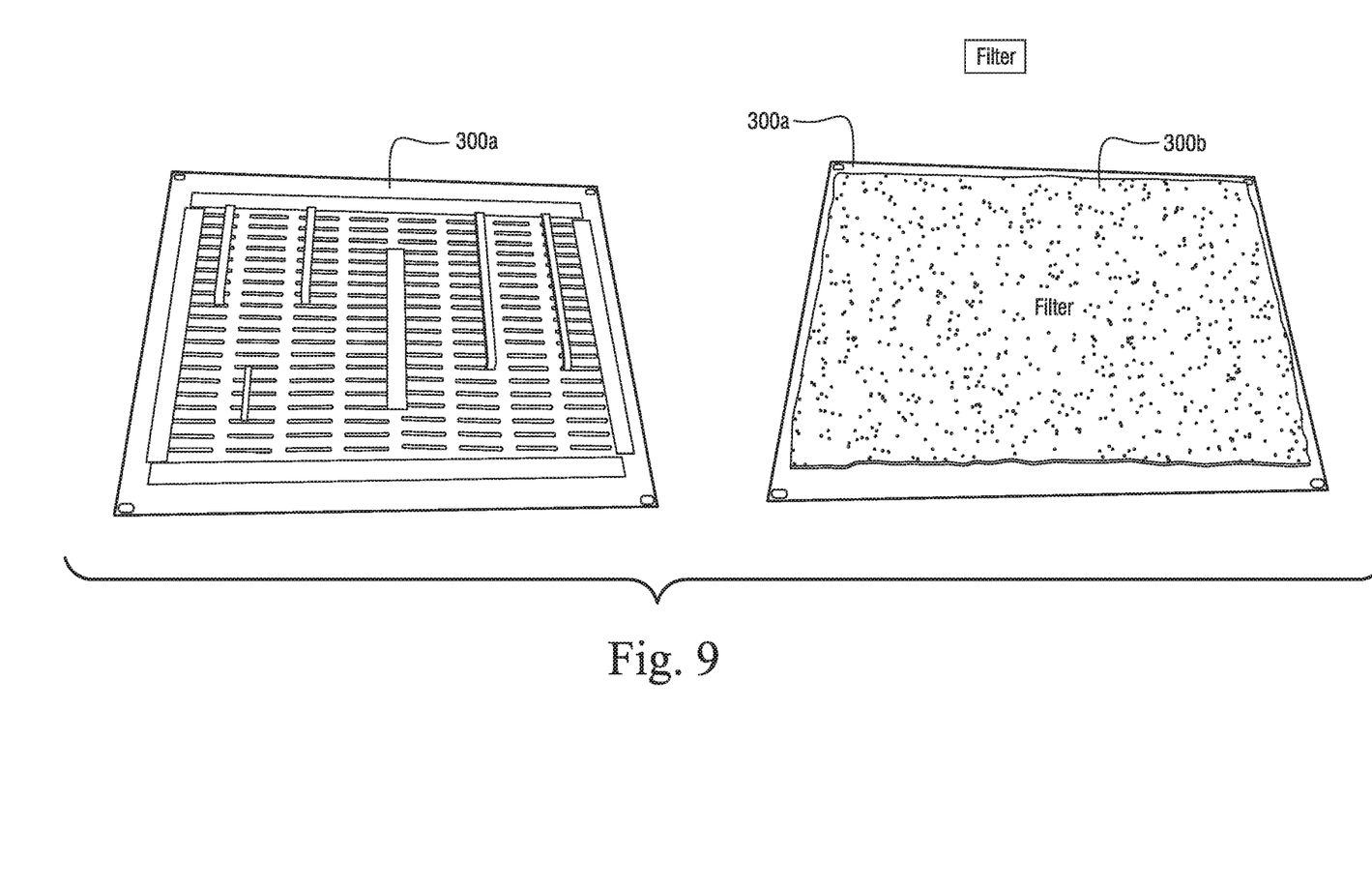
FIG. 9 shows example non-limiting thermal management/filtration.

Solar Panels 104 act as Sun Shields to reduce radiant heat buildup. Convection cooling occurs between the panels and the enclosure. A Secondary Fan 204 (see FIG. 8) made by EBMpapst is enabled at 112 degrees to cool the electronics assembly. This fan 204 is controlled by two thermal switches for redundancy. It is IP-68 rated and has a MTBF of 100,000 Hrs. All outside air drawn into the enclosure is cleaned by a 4 year filtration system 300 (see FIG. 9). Convection heat created by the East and West Solar panels 104 is directed to the top solar panel 104d to hasten the melting of snow and ice.

Figure 10:
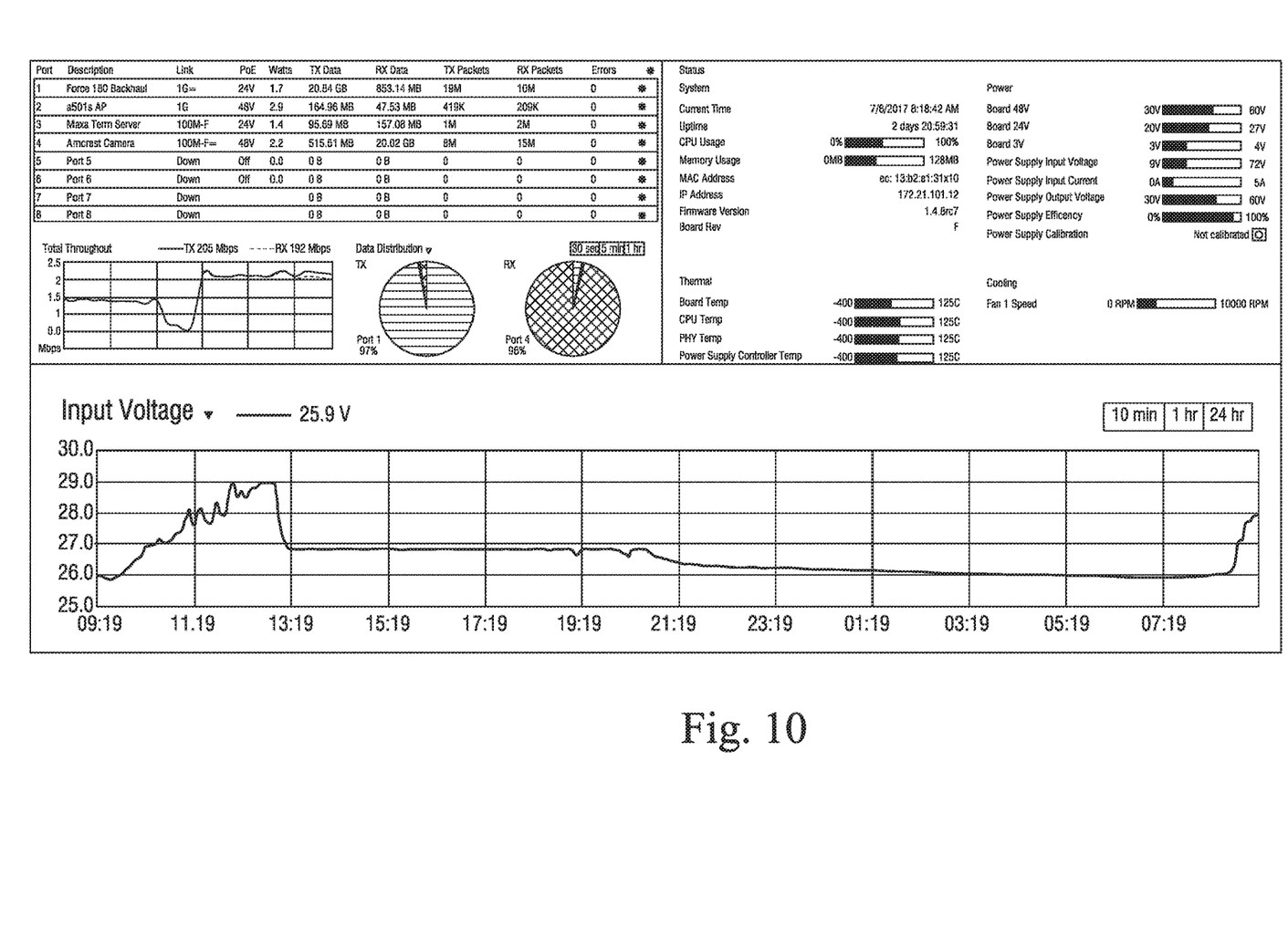
FIG. 10 shows example remote display providing complete management.
Figure 11:
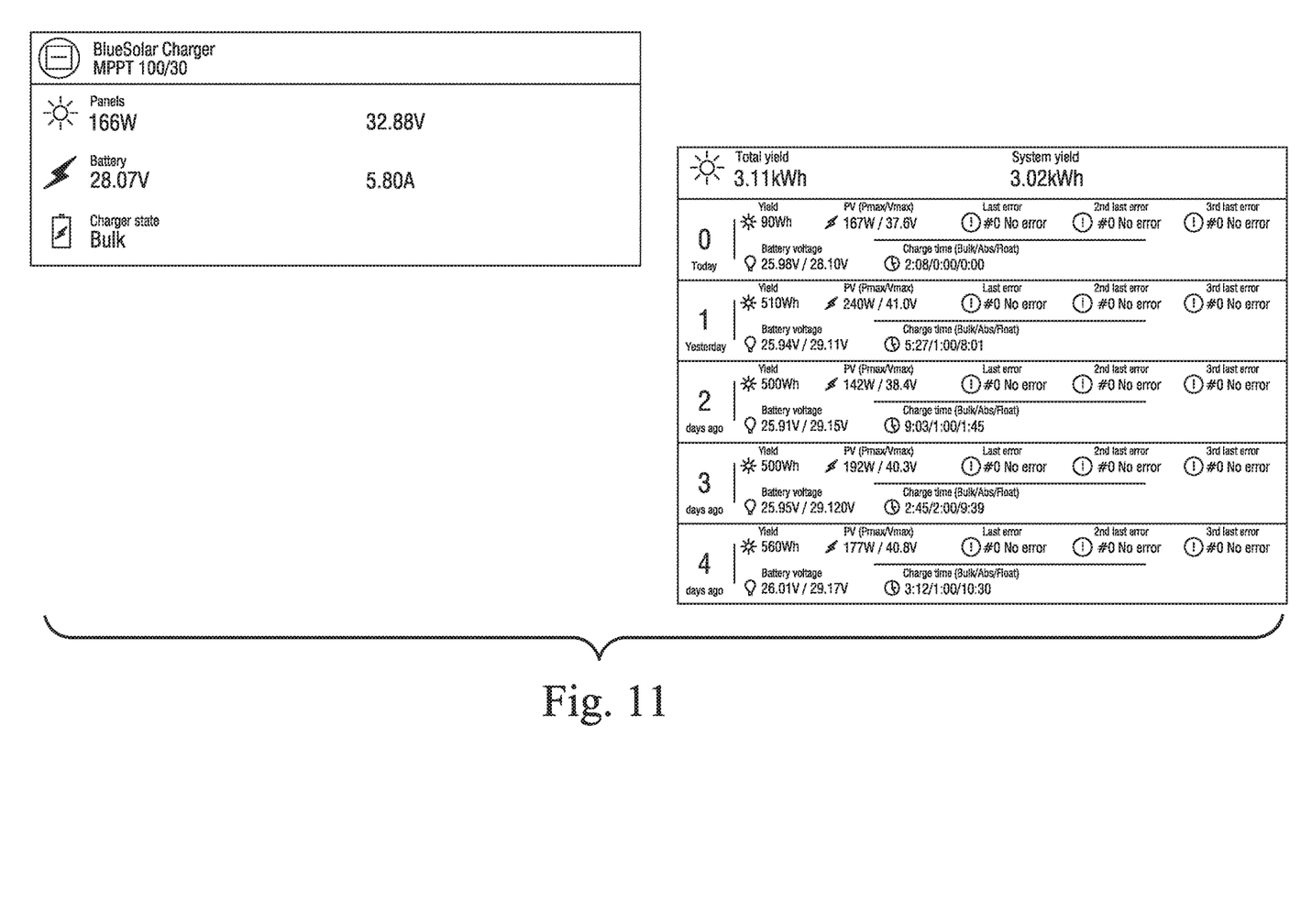
FIG. 11 shows another remote display providing example complete management.

The POE (power over Ethernet) switch 216 complies with IEEE 802.3af PoE and 802.3at PoE Plus standards, which provide up to 30 watts of power per port for advanced Powered Devices (PD) like 802.11ac wireless APs and other devices 220, 222, 224, 226, 228. In this example, switch 216 accommodates 24 VDC and 48 VDC power requirements of these devices as well routing high speed data between them. The POE switch 214 also provides connectivity to terminal server 214, allowing external wireless connectivity and access to monitoring and control functions provided by and through the terminal service (see e.g., FIGS. 10-11). For example, a remote station connecting with system 100 via a backhaul connection such as cellular telephone 228 can monitor activity and data usage of each of various devices (e.g., camera 124, access points 224, 226, etc.) monitor pertinent status and control of the terminal server 214 including CPU usage, monitor input voltage produced by the solar power system, monitor the status of MPPT charger 210, and monitor its historical charging history. This allows a remote monitor to constantly know the status, state and health of system 100 from any location in the world. Intervention and control (with proper authentication) is also possible to reboot/reset system 100 to avoid the need for manual on-site intervention.

Example non-limiting technology herein can:
operate 24×7 Even at Continual Outdoor Low Light Conditions.
be able to supply enough Watt Hours to operate 24×7.
operate in ambient temperatures from −22 deg F. to 140 deg F.
be safe to deploy, operate and service.
be able to sustain high straight line winds.
The Battery Bank 202 shall be maintenance free and have at least a 4 year lifespan.
be fully manageable by remote means (see FIGS. 10 and 11) including power cycling.
support industry standards for networking and network security.
support physical security including video surveillance.
Solar Powered in Very Low Light Conditions.
No Solar Alignment Required.
Maintains Continuous Reliable Power for more than Four Years (1,600 Cycles).
Will Maintain Operation on Batteries 202 alone for up to Ten Days (6,912 Wh).
Requires No Battery Maintenance.
Air Filtration System 300 requires No Maintenance for up to Four Years.
Free Standing.
Moveable with a Fork Lift or Pallet Jack.
Integrated Telescoping Tower 118.
Power over Ethernet at both 24 VDC and 48 VDC.
Can Operate Multiple Technologies not limited to PTP, PMP, Wi-Fi, Narrow Band, Video Surveillance.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A free-standing communications system comprising:
a weatherproof housing having at least first, second, third and fourth outside surfaces, wherein the third outside surface is perpendicular to each of the first and second outside surfaces;
a first solar panel disposed on the first outside surface;
a second solar panel disposed on the second outside surface;
a third solar panel disposed on the third outside surface;
a fourth solar panel disposed on the fourth outside surface; and
plural wireless communications devices powered by electrical power the first, second, third and fourth solar panels produce based on exposure of the panels to solar energy from the sun, the plural wireless communications devices interconnecting wireless local area network communications to a cellular or satellite backhaul,
wherein the first, second, third and fourth solar panels are configured to continually power the plural wireless communications devices even under low outdoor light conditions irrespective of the rotational alignment of the housing relative to the position of the sun.

2. The system of claim 1 wherein the solar panels supply enough Watt Hours to operate the plural wireless communications devices continuously.

3. The system of claim 1 wherein the system can operates in ambient temperatures from −22 deg F. to 140 deg F.

4. The system of claim 1 wherein the system is structured to be safe to deploy, operate and service.

5. The system of claim 1 wherein the system is structured to sustain high straight line winds.

6. The system of claim 1 wherein the system includes a battery bank connected to the solar panels, the battery bank being maintenance free and having at least a 4 year lifespan.

7. The system of claim 1 wherein the system is fully manageable by a remote controller to perform remotely controlled functions including power cycling.

8. The system of claim 1 wherein the system is structured to support industry standards for networking and network security.

9. The system of claim 1 wherein the system is structured to support physical security including video surveillance.

10. The system of claim 1 wherein the system maintains continuous reliable power for more than four years or 1,600 Cycles.

11. The system of claim 1 wherein the system is structured to maintain operation on batteries alone for up to ten days or consumption of 6,912 watt hours.

12. The system of claim 1 wherein the system is structured to require no battery maintenance.

13. The system of claim 1 wherein the system further comprises an air filtration system.

14. The system of claim 1 including an integrated telescoping tower projecting from the housing, the tower carrying antennas coupled to at least some of the plural wireless communications devices.

15. The system of claim 1 wherein the system is further structured to provide power over Ethernet at both 24 VDC and 48 VDC.

16. The system of claim 1 wherein the plural wireless communications devices comprise a Wi-Fi transceiver, a Narrow Band radio frequency transceiver, and a Video Surveillance device.

17. A free standing communications system comprising:
a solar power source providing first, second and third solar-sensitive surfaces at right angles to one another, the solar power source encasing a terminal server, a switch, and multiple wireless communications devices;
the terminal server being powered by the solar power source irrespective of the rotational alignment of the surfaces relative to the position of the sun;
the switch being operatively coupled to the terminal server and powered by the solar power source irrespective of the rotational alignment of the surfaces relative to the position of the sun;
the multiple wireless communications devices being operatively coupled to the switch and powered by the solar power source irrespective of the rotational alignment of the surfaces relative to the position of the sun, the switch configured for routing data between said multiple wireless communications devices to enable local wireless and backhaul connectivity and remote monitoring and control of the system; and a pole that suspends at least an antenna for said backhaul connectivity.

18. The system of claim 17 wherein the pole also suspends a digital camera.

19. The system of claim 17 wherein the switch provides power over Ethernet.

20. The system of claim 17 wherein the multiple wireless communications devices comprise (a) a point-to-point transceiver, (b) a point-to-multipoint transceiver, and (c) an 802.11 access point.

* * * * *

UNITED STATES PATENT AND TRADEMARK OFFICE
CERTIFICATE OF CORRECTION

PATENT NO. : 10,484,305 B2
APPLICATION NO. : 15/948636
DATED : November 19, 2019
INVENTOR(S) : Hill et al.

Page 1 of 1

It is certified that error appears in the above-identified patent and that said Letters Patent is hereby corrected as shown below:

On the Title Page

Item (72) Inventors, should read:
--Steve Hill, Akron, OH (US); Greg Dunnell, Akron, OH (US)--

Item (73) Assignee, should read:
--Buckeye Mountain, Inc., Akron, OH (US)--

Signed and Sealed this
Twenty-third Day of June, 2020

Andrei Iancu
*Director of the United States Patent and Trademark Office*